United States Patent [19]

Govoni et al.

[11] Patent Number: 5,387,749
[45] Date of Patent: Feb. 7, 1995

[54] PROCESS FOR THE PREPARATION OF LINEAR LOW DENSITY POLYETHYLENE

[75] Inventors: Gabriele Govoni, Renazzo Ferrara; Massimo Covezzi, Ferrara, both of Italy

[73] Assignee: Himont Incorporated, Wilmington, Del.

[21] Appl. No.: 30,053

[22] PCT Filed: Jul. 30, 1992

[86] PCT No.: PCT/EP92/01731
§ 371 Date: Mar. 5, 1993
§ 102(e) Date: Mar. 5, 1993

[87] PCT Pub. No.: WO93/03078
PCT Pub. Date: Feb. 18, 1993

[30] Foreign Application Priority Data
Jul. 31, 1991 [IT] Italy .................. MI91A 022142

[51] Int. Cl.⁶ .................................................. C08L 23/16
[52] U.S. Cl. ............................. 525/53; 525/240; 525/247; 525/270; 525/322; 525/324
[58] Field of Search ............... 525/53, 240, 247, 270, 525/322, 324

[56] References Cited

U.S. PATENT DOCUMENTS

| | | | |
|---|---|---|---|
| 4,414,132 | 11/1983 | Goodall et al. | 502/169 |
| 4,415,718 | 11/1983 | Miyoshi et al. | 526/348.6 |
| 4,454,306 | 6/1984 | Fujii et al. | 525/323 |
| 4,525,547 | 6/1985 | Kato et al. | 526/68 |
| 4,567,155 | 1/1986 | Tovrog et al. | 502/123 |
| 4,871,813 | 10/1989 | Senez | 525/240 |
| 4,946,816 | 8/1990 | Cohen et al. | 502/126 |
| 4,977,210 | 12/1990 | Kerth et al. | 525/53 |
| 5,149,738 | 9/1992 | Lee et al. | 525/53 |
| 5,166,268 | 11/1992 | Ficker | 525/198 |

FOREIGN PATENT DOCUMENTS 0170255 2/1986 European Pat. Off.

*Primary Examiner*—Joseph L. Schofer
*Assistant Examiner*—David Wu
*Attorney, Agent, or Firm*—Bryan Cave

[57] ABSTRACT

Process for the preparation of LLDPE with improved processability by gas phase polymerization performed in two or more reactors, wherein, whatever the order, in one of the reactors a mixture of ethylene and an alpha-olefin $CH_2=CHR$, where R is an alkyl having 1-10 carbon atoms, is polymerized to yield a copolymer containing up to about 20% by mole of the alpha-olefin, and in another reactor a mixture of propylene and an alpha-olefin $CH_2=CHR'$, where R' is an alkyl radical having 2-10 carbon atoms, is polymerized to yield a copolymer containing from 5 to 40% by weight of said olefin, in an amount of 5-30% with respect to the total polymer weight and the polymer-catalyst system obtained in the first reactor is fed to the other reactors.

14 Claims, 1 Drawing Sheet

PROCESS FOR THE PREPARATION OF LINEAR LOW DENSITY POLYETHYLENE

The present invention relates to a process for the preparation of linear low density polyethylene (LLDPE) endowed with improved processability by gas phase polymerization of the monomers, in two or more fluidized bed or mechanically stirred bed reactors, wherein, whatever the order, in one of the reactors mixtures of ethylene and an alpha-olefin $CH_2=CHR$ (R=alkyl having 1-10 carbon atoms) are polymerized to yield LLDPE and in another reactor mixture of propylene-and an alpha-olefin $CH_2=CHR'$, where R' is an alkyl radical having 2-18 carbon atoms, are polymerized, using the same catalyst in both reactors.

LLDPE has a variety of applications, but it is particularly employed in the preparation of films, because LLDPE films are endowed with improved mechanical and optical properties compared to films of LDPE.

The production of LLDPE films, however, shows some difficulties, mainly due to the fact that the polymer in the melted state has an insufficiently high melt strength, while its viscosity in the melted state is rather high.

In order to keep the productivity unaltered, it is necessary to modify the film extruders, for instance by widening the slit or increasing the temperature of the extruder head.

These modifications cause difficulties in the cooling of the bubble being blown at the extruder outlet and dishomogeneity in the film thickness.

In addition to these drawbacks, the hot welding of LLDPE films shows poor resistance to heat.

In order to overcome the shortcomings above, it was proposed to use blends of LLDPE with a semicrystalline copolymer of propylene with an alpha-olefin $CH_2=CHR'$ where R' is an alkyl radical having 2-10 carbon atoms, in particular 1-butene (U.S. Pat. No. 4,871,813).

The copolymer contains from 7 to 40% by weight of alphaolefin, has a fusion enthalpy lower than 75 J/g and is added in an amount of from 1 to 25% by weight.

The LLDPE-copolymer blend is prepared by mixing in the melted state the components pre-mixed in the solid state (in the form of powder or granules).

Mixing of the components in the solid state and feeding of such mixture directly into the extruder to mold the finished article is also contemplated.

The LLDPE is obtained by conventional polymerization methods, whereas the propylene-alpha olefin copolymer is prepared separately, employing stereospecific catalysts capable of yielding a semicrystalline copolymer having a fusion enthalpy not higher than 75 J/g.

The preparation of the above blends requires two separate polymerization lines for producing the two polymer components and then a blending step for mixing the components in the melt in an extruder. Blending of polymers in the melt is a high energy-consuming operation.

It has now been found that it is possible to produce blends of LLDPE and a propylene-alpha olefin $CH_2=CHR'$ copolymer endowed with improved processability and capable of forming films exhibiting good mechanical and optical properties directly in polymerization, using at least two reactors in series, wherein, whatever the order, in one of the reactors the LLDPE and in the other the propylene-alpha olefin copolymer are synthesized and wherein in both reactors the same catalyst is employed.

The use of the same catalyst in the various reactors in series has the advantage of utilizing a single production line instead of two, as well as growing the polymer blend onto each catalyst particle, thus obtaining a composition in which the components are homogeneously mixed in the solid state, with no need of the pelletization step which is necessary when the components are prepared by separate processes.

Therefore, the polymer can be directly fed into the film extruders, thereby attaining a higher film production rate and a lower energy consumption. In fact, the non-pelletized granules, not having been subjected to the melting-solidification process of the pelletization step, have lower crystallinity and higher melt index.

Moreover, the homogenization at the level of each single particle achievable by the process of the present invention has beneficial effects on the properties of the film.

The process of the invention comprises the following steps:

a) pre-contact of the catalyst components in the substantial absence of polymerizable olefins (the olefins should not be present in such a quantity as to produce more than about 1 g polymer/g of solid catalyst component) operating in such a way as to obtain a stereospecific catalyst capable of yielding during the polymerization step c2) a copolymer having an insolubility in xylene at 25° C. of at least 80%;

b) pre-polymerization, using the catalyst obtained in step a), of propylene or mixtures thereof with ethylene and/or alpha-olefins $CH_2=CHR$, where R is an alkyl radical having from 2 to 10 carbon atoms, such as butene-1, hexene-1, 4-methyl-pentene-1, in such conditions as to obtain a polymer having an insolubility in xylene at 25° C. higher than 60%, in an amount of from about 1 to about 1000 g per g of solid catalyst component;

c) polymerization of the monomers in gas phase, performed in two or more fluidized bed or mechanically stirred bed reactors in series, wherein, whatever the order:

c1) in one of the reactors a mixture of ethylene and an alpha-olefin $CH_2=CHR$, where R is an alkyl radical having from 1 to 10 carbon atoms, is polymerized to obtain an ethylene-alpha olefin copolymer containing up to about 20% by moles of alpha-olefin, and c2) in another reactor, after removing the unreacted monomers coming from the reactor c1) if c1) is the first reactor, a mixture of propylene and an alpha-olefin $CH_2=CHR'$, where R' is an alkyl radical having from 2 to 10 carbon atoms, is polymerized to yield a copolymer containing from 5 to 40% by weight of the alpha olefin, in an amount of 5-30% by weight with respect to the total weight of the polymer obtained in c1) and c2);

and wherein the prepolymer-catalyst system obtained in b) is fed to the reactor in c1) and the polymer-catalyst system obtained in c1) to the reactor in c2). In case the first reactor is used in c2), the unreacted monomers coming from c2) are removed before feeding the reactor in c1) with the polymer-catalyst system obtained in c2).

Preferably, for an efficient control of the gas phase reaction, an alkane having 3–5 carbon atoms, preferably propane, is kept in the reaction gas, in particular in the first reactor where the catalyst reactivity is higher, in a concentration of from 20 to 90% by moles based on the total gas.

Preferably, the copolymer formed in c2) contains 10–15% by weight of the alpha-olefin and forms 15–25% of the total weight of the polymer in c1) and c2).

Surprisingly and unexpectedly the pre-forming of the catalyst, the pre-polymerization treatment with propylene and the presence of an alkane in the gas phase in the molar concentration indicated above, allow to control the polymerization process in the gas phase without the drawbacks usually encountered in the processes of the prior art, drawbacks which are essentially due to the low heat transfer capability of the gas phase and to the formation of electrostatic charges, which determine the tendency of the catalyst and the polymer particles to adhere to the reactor walls.

The catalyst employed in the process of the invention furthermore allows the polymer blend to grow onto each single particle of the solid catalyst component, so obtaining a good homogenization of the polymer blend.

The catalyst components employed in step a) comprise:

1) A solid component comprising a titanium compound containing at least one titanium-halogen bond supported on a magnesium halide in active form. The solid component also contains an electron-donor compound (internal donor) when the catalyst itself is not sufficiently stereospecific for producing in step c2) propylene copolymers having the insolubility characteristics reported in c2). As known, the stereospecificity of the catalysts supported on magnesium dihalide increases when using an internal donor. As a general rule, the internal donor is always used in order to obtain catalysts capable of yielding in step c2) propylene-alpha olefin $CH_2=CHR'$ copolymers, having an insolubility in xylene higher than 80% and preferably comprised between 85–94%.

2) An alkyl aluminum compound.

3) Optionally an electron-donor compound (external donor) of the same or of a different type with respect to the electron-donor present in the solid component 1). The external donor is used to confer to the catalyst the required high stereospecificity. However, when particular diethers are employed as internal donors, such as those described in the European Patent Application A-344755, the catalyst stereospecificity is sufficiently high and no external donor is required. The catalyst formed in step a) is fed continuously or discontinuosly into step b).

Step b) can be carried out in liquid or gas phase. Preferably, step b) is carried out in the liquid phase, using as a liquid medium the propylene itself or a hydrocarbon solvent such as n-hexane, n-heptane, cyclohexane or an alkane having a low boiling point such as propane, butane (kept in the liquid state in the conditions employed in b).

The propylene pre-polymerization in step b) is carried out at a temperature comprised in the range of from 0° to 80° C., preferably from 5° to 50° C.

Propylene or the mixtures of propylene with ethylene and/or other alpha olefins, such as butene-1, hexene-1, 4-methyl pentene-1, are polymerized to yield polymers having an insolubility in xylene higher than 60%. The prepolymer yield ranges from about 1 g to about 1000 g of polymer per g of solid catalyst component, preferably from 5 g to 500 g of polymer per g of solid catalyst component.

Step b) can be performed continuously or discontinuously. In the former case, suitable means are employed for removing the unreacted propylene prior to feeding the prepolymer-catalyst system of step b) to the gas phase reactor.

The gas phase polymerization of step c) is performed according to known techniques operating in two or more fluidized bed or mechanically stirred bed reactors connected in series.

The monomers are fed into the two reactors in such a ratio as to yield a copolymer having the desired composition.

As indicated above, the unreacted monomers are removed prior to feeding the reaction mixture of the first reactor into the second reactor.

The process is carried out at a temperature lower than the synthesization temperature of the polymer. Generally the temperature is comprised between 50° and 120° C. and preferably between 60° and 100° C. The total pressure is comprised between 1.5 and 3 MPa.

As indicated above, it is immaterial whether the ethylene-alpha olefin mixture is polymerized first to form the LLDPE copolymer or the propylene-alpha olefin $CH_2=CHR'$ mixture is polymerized first to form the corresponding copolymer.

However, synthesizing the propylene-alpha olefin copolymer in the first reactor is preferred, in order to obtain a polymer endowed with better flowability and a higher bulk density.

The propylene-alpha olefin copolymer is characterized by a fusion enthalpy (measure in accordance with the method described in U.S. Pat. No. 4,871,813) higher than 70 J/g, preferably comprised between 75 and 95 J/g, and by an isotactic index (determined by measuring the copolymer fraction which is insoluble in xylene at 25° C.) higher than 80 and generally comprised between 85 and 94.

Surprisingly, and in contrast with the characteristics of the propylene-alpha olefin copolymers used in the prior art, the process of the present invention allows to obtain LLDPE polymers endowed with good processability even though the crystallinity and isotacticity of the copolymer used are high.

As indicated above, the gas phase present in the various reactors preferably contains a $C_3$–$C_5$ alkane in a molar amount of from 20 to 90% with respect to the total gases. Examples of suitable alkanes are propane, butane, isobutane, n-pentane, isopentane, cyclopropane, cyclobutane. Propane is the preferred alkane.

The alkane is fed into the first reactor with the monomer mixture or separately and it is recycled with the recycle gas, i.e. with the portion of the gas which does not react in the bed and is removed from the polymerization zone, preferably by conveying it into a zone above the bed where the velocity is reduced and the particles entrained in the gas can again fall into the bed.

The recycle gas is then compressed and passed through a heat exchanger, where the heat of reaction is removed, before being recycled to the bed. See, for instance, U. S. Pat. Nos. 3,298,792 and 4,518,750 for a description of the gas phase technology.

It is surprising and completely unexpected that the alkanes allow a very good control of the gas phase reaction whereas using an inert gas such as nitrogen is ineffective. In fact, the use of nitrogen does not prevent the formation of large polymer aggregates ("chunks"), which necessarily cause stopping of the operation of the plant.

According to a preferred embodiment, the alkane concentration in the first reactor is kept higher than that in the second (or subsequent) reactor.

Generally, the alkane is circulated through both reactors.

To achieve a complete fluidization, the recycle gas and, if preferred, a part or all of the make-up gas are reintroduced into the reactor at a point under the bed. A gas distribution plate, placed above the point of return, allows an effective distribution of the gas and furthermore acts as a support for the polymer bed when the gas flow is stopped.

Hydrogen can be used as chain transfer agent to control the molecular weight of the polymer.

A typical simplified scheme of the process is shown in the attached FIG. 1. Reference numeral 1 indicates the apparatus where the catalyst components are pre-contacted. The loop reactor 2 is the pre-polymerization reactor. The gas phase reactors are indicated with 4 and 6, the solid-fluid separators with 3, 5 and 7. The catalyst components and the diluting agent (propane) are fed into the pre-contact reactor 1, as shown by arrows A. The pre-contacted catalyst is fed into the loop reactor 2 as shown by arrows B; propylene is fed into said loop reactor as shown by arrow E. The prepolymer-catalyst system is fed into the separator 3 and from the latter into the gas phase reactor 4, where, in the gas recycle line, propylene, the alpha olefin $CH_2=CHR'$, hydrogen and propane are fed, as shown by arrow C. The polymer which leaves the reactor 4, after passing through the separator 5, is introduced into the reactor 6, where ethylene, the alpha olefin $CH_2=CHR$, hydrogen and propane are fed, as shown by arrow D. The polymer in the form of spherical granules is discharged from the reactor 6 into the separator 7.

The active magnesium dihalides used as support for Ziegler-Natta catalysts are widely described in patent literature. The use of such dihalides is described for the first time in the U.S. Pat. Nos. 4,298,718 and 4,495,338.

The magnesium dihalides which form the support for the catalyst components employed in the process of the present invention are characterized by X-ray spectra wherein the most intense diffraction line appearing in the spectrum of the nonactive halide has a lowered intensity and is substituted by a halo which maximum intensity is shifted toward lower angles with respect to the most intense line.

In the most active forms of the magnesium dihalides, the most intense line is no longer present and is substituted by a halo with the maximum intensity shifted as described above.

The titanium compounds suitable for the preparation of the solid catalyst component comprise the titanium halides, such as $TiCl_4$, which is preferred, and $TiCl_3$, and the haloalcoholates, such as trichlorophenoxy titanium and trichlorobutoxy titanium.

The titanium compound can be used as a mixture with other transition metal compounds, such as vanadium, zirconium and hafnium.

Suitable internal electron-donors comprise ethers, esters, amines, ketones and diethers of the general formula:

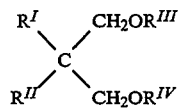

wherein $R^I$ and $R^{II}$, equal to or different from each other, are alkyl, cycloalkyl and aryl radicals having from 1 to 18 carbon atoms, and $R^{III}$ and $R^{IV}$, equal to or different from each other, are alkyl radicals having from 1 to 4 carbon atoms.

The preferred compounds are the alkyl, cycloalkyl and aryl esters of polycarboxylic acids such as phthalic and maleic acid and diethers of the formula:

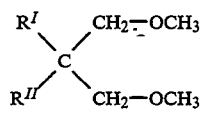

wherein $R^I$ and $R^{II}$ are defined as above.

Examples of such compounds are: di-n-butyl-phthalate, di-isobutyl-phthalate, di-n-octyl-phthalate, 2-methyl-2-isopropyl-1,3-dimethoxy-propane, 2-methyl-2-isobutyl-1,3-dimethoxy-propane, 2,2-di-isobutyl-1,3-dimethoxypropane and 2-isopropyl-2-isopenthyl-1,3-dimethoxy-propane.

The internal donor is generally present in molar ratios of from 1:8 to 1:14 with respect to Mg. The titanium compound, expressed as Ti, is present in amounts of from 0.5 to 10% by weight.

The solid catalyst components can be prepared according to the methods described in the U.S. Pat. Nos. 4,748,221 and 4,803,251.

If the stereospecificity of the obtained catalyst is insufficient for the purposes of the present invention, it can be easily modified according to the well known techniques described above.

Using the catalysts prepared from the catalyst components described in the European Patent Application EP-A-344,755, it is possible to obtain, with high specific activities (generally from 10 to 100 Kg/h/g of solid catalyst component), spherically shaped polymers with an average diameter of from 300 to 5000 microns, endowed with high bulk density and flowability.

The procedure employed in preparing the catalyst components in the examples is a preferred embodiment of the method described in European Patent Application EP-A-344,755, which is herein incorporated by reference.

In particular, in the European Application indicated above the catalyst components are prepared from spherulized adducts $MgCl_2 \cdot n$ ROH (R' is an alkyl or cycloalkyl radical having 2-10 carbon atoms and n is a number from about 3.5 to about 2.5), from which the alcohol is partially removed by heating at increasing temperatures of from about 50° C. to about 100° C.

In the formula above n is about 3; by heating, n is lowered to values of from 2.5 to 1 or lower.

The spherulized and partially de-alcoholated product is reacted with an excess of $TiCl_4$ at temperatures of from about 80° to about 135° C.; the excess of $TiCl_4$ is removed for instance by hot filtration.

The treatment with TiCl$_4$ is usually repeated and the solid from which the unreacted TiCl$_4$ is removed is then washed with an inert hydrocarbon until the reaction of chlorine ions disappears.

The reaction with TiCl$_4$ is carried out in the presence of an electron-donor compound, selected in particular from the alkyl esters of the phthalic acid, such as di-n-butyl-phthalate, di-isobutyl-phthalate, di-n-octyl-phthalate, and the diethers having the general formula above.

The electron-donor compound can also be reacted with the adduct, before the reaction with the titanium compound.

The alkyl aluminum compound employed as co-catalyst is selected from the trialkyl aluminum compounds, such as Al-tri-ethyl, Al-triisobutyl, Al-tri-n-butyl, Al-tri-n-octyl. Mixtures of trialkyl aluminum compounds with Al-alkylhalides or Al-alkyl-sesquihalides, such as AlEt$_2$Cl and Al$_2$Et$_3$Cl$_3$, can also be employed.

The Al/Ti ratio in the catalyst formed in step a) is greater than 1 and is generally comprised between 20 and 800.

The external donor can be the same or different from the electron-donor compound present as internal donor.

The molar ratio alkyl aluminum compound/external donor is generally comprised between 2 and 30.

When the internal donor is an ester of a polycarboxylic acid, particularly a phthalate, for instance isobutylphatale or n-octylphtalate, the external donor is preferably selected from the silicon compounds of the formula R$_1$R$_2$Si(OR)$_2$ or R$_1$Si(OR)$_3$, where R$_1$ and R$_2$ are alkyl, cycloalkyl or aryl radicals having from 1 to 18 carbon atoms and R is an alkyl radical having 1–6 carbon atoms. Examples of said silanes are methyl-cycloexyl-dimethoxy silane, diphenyl-dimethoxy silane, methyl-t-butyl-dimethoxy silane and triphenyl methoxylane.

The diethers of the general formula reported above can also be conveniently used as external donors.

The solubility in xylene of the propylene polymer prepared in step b) and also of the propylene-alpha olefin copolymer is determined by dissolving 2 g of polymer in 250 ml of xylene at 135° C. and stirring the system. After 20 minutes, the solution is cooled down to 25° C. After 30 minutes the precipitated material is filtered; the solution is evaporated in a nitrogen flow and the residue is dried at 80° C.

In this manner the percentage of polymer in xylene at room temperature and the percentage of insoluble polymer are calculated.

The following examples are given to better illustrate the invention and cannot be construed as limitative of its scope. Unless otherwise indicated, all the data are expressed by weight.

General procedure

The solid catalyst component employed in the examples is prepared as follows:

28.4 g of MgCl$_2$, 49.5 g of anhydrous ethanol, 10 ml of vaseline oil ROL OB/30 and 100 ml of silicone oil having a viscosity of 350 cs are introduced, in an inert atmosphere, into a reactor equipped with a stirrer and heated to 120° C., until MgCl$_2$ is dissolved. The hot reaction mixture is then transferred into a 1,500 ml vessel, equipped with a stirrer Ultra Turrax T-45 N and containing 150 ml of vaseline oil and 150 ml of silicone oil. The temperature is kept at 120° C. while stirring for 3 minutes at 3,000 r.p.m. The mixture is then discharged into a 2 liter vessel equipped with a stirrer and containing 1,000 ml of anhydrous n-heptane cooled to 0° C. The mixture is stirred at a speed of 6 meters per second for about 20 minutes, keeping the temperature at 0° C. The so obtained particles are recovered by filtration, washed with 500 ml of n-hexane and gradually heated, increasing the temperature from 50° C. to 100° C. for a time sufficient to reduce the alcohol content from 3 moles to the molar content indicated in the examples.

The adduct (25 g), containing the alcohol in the amounts indicated in the examples, is transferred into a reactor equipped with a stirrer and containing 625 ml of TiCl$_4$ at 0° C. under stirring. The reactor is then heated to 100° C. for one hour. When the temperature is 40° C., di-isobutylphthalate is added in such an amount that the Mg/phthalate molar ratio is 8.

The reactor contents are then heated to 100° C. for two hours and then the solid separates by sedimentation.

The hot liquid is removed by a siphon. 500 ml of TiCl$_4$ are added and the mixture is heated to 120° C. for an hour under stirring. Stirring is stopped and the solid separates by sedimentation. The hot liquid is removed by a siphon. The solid is washed with portions of n-hexane at 60° C. and then at room temperature.

DESCRIPTION OF THE DRAWINGS

The attached Figure is a simplified diagram representing embodiments of the invention wherein two fluidized bed or mechanically stirred bed reactors connected to each other by a special transfer device.

EXAMPLE 1

Figure 1:
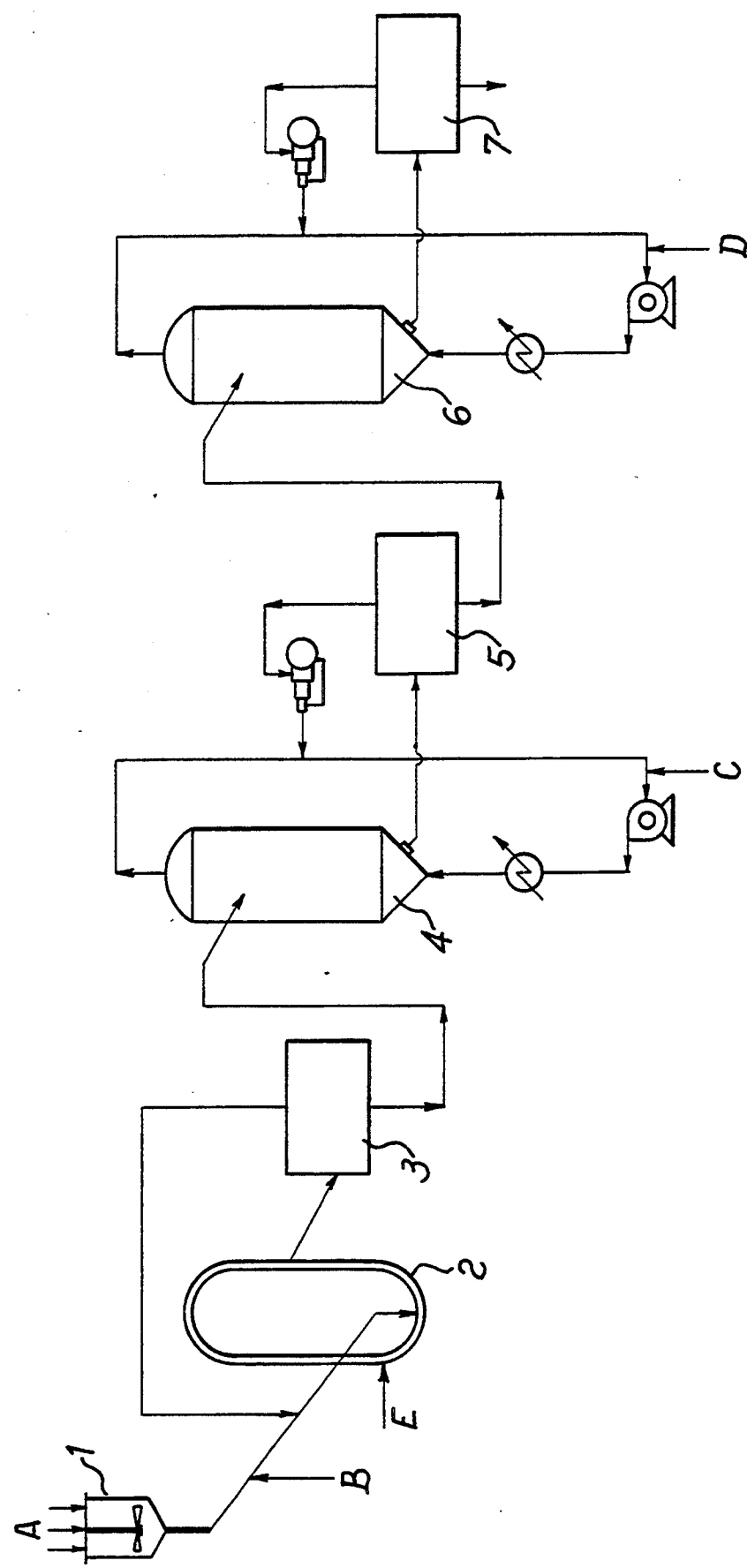

An apparatus is utilized which operates in continuous and comprises a reactor in which the catalyst components are mixed to form the catalyst, a loop reactor receiving the catalyst formed in the previous step and being fed with liquid propylene and propane, and two fluidized bed reactors connected in series, the first reactor receiving the pre-polymer formed in the preceding step and discharging the polymer into the second reactor after removal of the unreacted monomers.

The process is carried out by feeding a solid catalyst component, prepared according to the general method reported above using a MgCl$_2$/ethanol adduct containing 35% by weight of alcohol, a solution of triethyl aluminum (TEAL) in n-hexane and methyl-cyclohexyl-dimethoxysilane as electron-donor in such an amount that the TEAL/silane ratio is 4 by weight and the TEAL/Ti ratio is 120 by moles, into the pre-contact reactor kept at the constant temperature of 20° C. Into the same reactor propane is also fed as inert medium. The residence time is about 8.8 minutes.

The product discharged from the reactor is then fed into a loop pre-polymerization reactor kept at 50° C. The residence time in the loop reactor is about 80 minutes.

The first reactor receiving the pre-polymer produced in the preceding step operates at 60° C. and at a reaction pressure of 1.8 MPa.

The average residence time of the polymer forming inside the reactor is about 80 minutes.

The reaction monomers and the gases fed into the reactor are the following:
propylene and butene;
hydrogen as molecular weight regulator;
propane.

The first reactor discharges into a gas-solid separation system which removes the undesired monomer (propylene) before feeding the polymer to the second polymerization step.

| Main operating conditions | |
|---|---|
| Pre-contact step | |
| temperature (°C.) = | 20 |
| residence time (min.) = | 8.8 |
| Pre-polymerization step | |
| temperature (°C.) = | 50 |
| residence time (min.) = | 80 |
| First gas phase reactor | |
| temperature (°C.) = | 60 |
| pressure (MPa) = | 1.8 |
| residence time (min) = | 68 |
| propylene (mole %) = | 4.8 |
| butene-1 (mole %) = | 1.2 |
| hydrogen (mole %) = | 0.6 |
| propane (mole %) = | 89 |
| % polymerization = | 11 |
| bonded butene (w %) = | 9.8 |
| MIL (230° C.) (g/10 min) = | 21 |
| Second gas phase reactor | |
| temperature (°C.) = | 90 |
| pressure (MPa) = | 1.75 |
| residence time (min) = | 76 |
| butene-1 (mole %) = | 8.6 |
| ethylene (mole %) = | 34 |
| hydrogen (mole %) = | 9.2 |
| propane (mole %) = | 44 |
| % polymerization = | 89 |
| bonded butene (wt %) = (final) | 7 |
| MIE (190° C., 2.16 Kg) = (final) (g/10 min) | 1.1 |
| F/E (21.6 Kg/2.16 Kg) = (final) | 35 |
| density (final) (g/cc) = | 0.916 |

EXAMPLE 2

The same apparatus is used as in Example 1.

The process is carried out by feeding the catalyst components into the pre-contact reactor, kept at a constant temperature of 0° C. with a residence time of 9.5 min.

The product discharged from the reactor is then fed into a loop pre-polymerization reactor, wherein a certain amount of liquid propylene and propane is also fed (as inert medium).

The residence time in the pre-polymerization reactor is about 80 minutes and the temperature is kept at 50° C.

The first reactor receiving the pre-polymer formed in the preceding step operates at 60° C. and at a reaction pressure of 1.8 MPa.

The reaction monomers and the gases fed into the reactor are the following:
ethylene;
hydrogen as molecular weight regulator;
propane

| Main operating conditions | |
|---|---|
| Pre-contact step | |
| temperature (°C.) = | 0 |
| residence time (min) = | 9.5 |
| Pre-polymerization step | |
| temperature (°C.) = | 50 |
| residence time (min) = | 80 |
| First gas phase reactor | |
| temperature (°C.) = | 60 |
| pressure (MPa) = | 1.8 |
| residence time (min) = | 45 |
| propylene (mole %) = | 15 |
| butene-1 (mole %) = | 3.5 |

| Main operating conditions | |
|---|---|
| hydrogen (mole %) = | 0.5 |
| propane (mole %) = | 80 |
| % polymerization = | 24 |
| bonded butene (wt %) = | 11.2 |
| MIL (230° C.) (g/10 min) = | 6.1 |
| Second gas phase reactor | |
| temperature (°C.) = | 90 |
| pressure (MPa) = | 1.75 |
| residence time (min) = | 83 |
| butene-1 (mole %) = | 4.8 |
| ethylene (mole %) = | 23 |
| hydrogen (mole %) = | 4.2 |
| propane (mole %) = | 68 |
| % polymerization = | 76 |
| bonded butene (wt %) = (final) | 7.5 |
| MIE (190° C., 2.16 Kg) = (final) (g/10 min) | 1.14 |
| F/E (21.6/2.16) = (final) | 50 |
| density (final) (g/cc) = | 0.915 |

The particle size distribution of the polymers obtained in Examples 1 and 2 are reported in Table 1.

TABLE 1

| | Units | Example 1 | Example 2 |
|---|---|---|---|
| SIZE DISTRIBUTION | | | |
| over 2,800μ | wt % | 0.5 | 1.0 |
| over 2,000μ | wt % | 18.3 | 18.0 |
| over 1,400μ | wt % | 45.0 | 41.6 |
| over 1,000μ | wt % | 29.2 | 30.3 |
| over 710μ | wt % | 5.0 | 7.5 |
| over 500μ | wt % | 0.6 | 0.8 |
| over 300μ | wt % | 0.3 | 0.4 |
| over 180μ | wt % | 0.2 | 0.3 |
| over 106μ | wt % | 0.1 | 0.1 |
| Residue | wt % | — | — |
| BULK DENSITY | | | |
| Poured | g/cm$^3$ | 0.398 | 0.425 |
| Tamped | g/cm$^3$ | 0.425 | 0.464 |
| FLOWABILITY | s | 10.0 | 9.0 |

We claim:

1. Process for the preparation of ethylene polymers endowed with improved processability by polymerization of ethylene with olefins $CH_2$=CHR, where R is an alkyl having 1-10 carbon atoms, by means of catalysts comprising the product obtained by reacting an alkyl aluminum compound with a solid component comprising a titanium halide or halo-alcoholate and optionally an electron-donor compound supported on a magnesium halide in active form, which process comprises the following steps:

a) pre-contact of the catalyst-forming components in the substantial absence of polymerizable olefins to form a stereospecific catalyst capable of yielding during the polymerization of the mixture of propylene and alpha olefins in step c2) a copolymer having an insolubility in xylene at 25° C. of at least 80%;

b) pre-polymerization, using the catalyst obtained in step a), of propylene or mixtures thereof with ethylene and/or alpha-olefins $CH_2$=CHR, where R is an alkyl having from 1 to 10 carbon atoms, in such conditions as to obtain a polymer having an insolubility in xylene at 25° C. higher than 60%, in an amount of from about 1 to about 1000 g per g of solid catalyst component;

c) polymerization of the monomers in the gas phase, operating in two or more fluidized bed or mechanically stirred bed reactors in series, wherein, whatever the order:

c1) in one reactor a mixture of ethylene and an alpha-olefin $CH_2=CHR$, where R is an alkyl radical having from 1 to 10 carbon atoms, is polymerized to obtain a copolymer of ethylene with said alpha olefin copolymer containing up to about 20% by moles of the alphaolefin; and, after removing the unreacted monomers coming from the first reactor, c2) in another reactor, a mixture of propylene and an alpha-olefin $CH_2=CHR'$, where R' is an alkyl radical having from 2 to 10 carbon atoms, is polymerized to yield a copolymer containing from 5 to 40% by weight of the alpha olefin, in an amount of 5-30% by weight with respect to the total weight of the polymer obtained in c1) and c2);

and wherein the prepolymer-catalyst system obtained in b) is fed into the first reactor and the polymer-catalyst system obtained in the first reactor is fed into the other reactors.

2. Process according to claim 1, wherein the copolymer formed in c2) contains 10-15% by weight of the alphaolefin and forms 15-25% of the total weight of the polymer obtained in c1) and c2).

3. Process according to claim 1, wherein the copolymer formed in c2) is a propylene-butene copolymer having an insolubility in xylene at 25° C. higher than 85%.

4. Process according to claim 1, wherein in step c) firstly the propylene-alpha olefin $CH_2=CHR'$ mixture of c2) is polymerized and thereafter the ethylene-alpha olefin mixture of c1) is polymerized.

5. Process according to claim 1, wherein the catalyst is obtained by reaction of an alkyl aluminum compound, an electron-donor compound and the solid component.

6. Process according to claim 5, wherein the electron-donor compound is a silane of formula $R_1R_2Si(OR)_2$ or $R_1Si(OR)_3$ wherein $R_1$ and $R_2$, the same or different, are alkyl, cycloalkyl or aryl radicals with 1-18 carbon atoms and R is an alkyl radical with 1-6 carbon atoms.

7. Process according to claim 1, wherein in the reaction gases an alkane having 3-5 carbon atoms is kept in a concentration of from 20 to 90% by moles on the total gases.

8. Process according to claim 7, wherein the alkane is propane.

9. Process according to claim 1, wherein the solid catalyst component is obtained from spherulized adducts $MgCl_2.n\ R'OH$, where R' is an alkyl or a cycloalkyl radical having 1-10 carbon atoms and n is a number from about 3.5 to about 2.5, from which the alcohol is partially removed up to values for n of from about 2.5 to 0.5.

10. Ethylene polymers in the form of particles, which particles comprise a mixture of a linear copolymer of ethylene with an alpha olefin $CH_2=CHR$, where R is an alkyl radical having from 1 to 10 carbon atoms, containing up to 20% by moles of the alpha olefin, in an amount of from 70 to 95% by weight with respect to the total weight of the mixture, and a copolymer of propylene with an alpha olefin $CH_2=CHR'$, where R' is an alkyl radical having 2-10 carbon atoms, containing from 5 to 30% by weight of the alpha olefin, in an amount of from 5 to 30% by weight with respect to the total weight of the mixture, said copolymer having an insolubility in xylene of at least 80% and a fusion enthalpy of more than 70 J/g.

11. Pelletized compositions obtained from the polymer particles according to claim 8.

12. Films obtained from the polymers according to claim 8.

13. Process according to claim 2, wherein the copolymer formed in c2) is a propylene-butene copolymer having an insolubility in xylene at 25° C. higher than 85%.

14. Films obtained from the polymers according to claim 9.

* * * * *

UNITED STATES PATENT AND TRADEMARK OFFICE
CERTIFICATE OF CORRECTION

PATENT NO.: 5,387,749

DATED : February 7, 1995

INVENTOR(S): Govoni et al.

It is certified that error appears in the above-identified patent and that said Letters Patent is hereby corrected as shown below:

On title page, item [30],

Foreign Application Priority Data   Delete "MI91A022142"

Insert   --MI91A002142--

Signed and Sealed this

Twenty-fifth Day of April, 1995

*Attest:*

BRUCE LEHMAN

*Attesting Officer*  *Commissioner of Patents and Trademarks*